UNITED STATES PATENT OFFICE 2,538,930

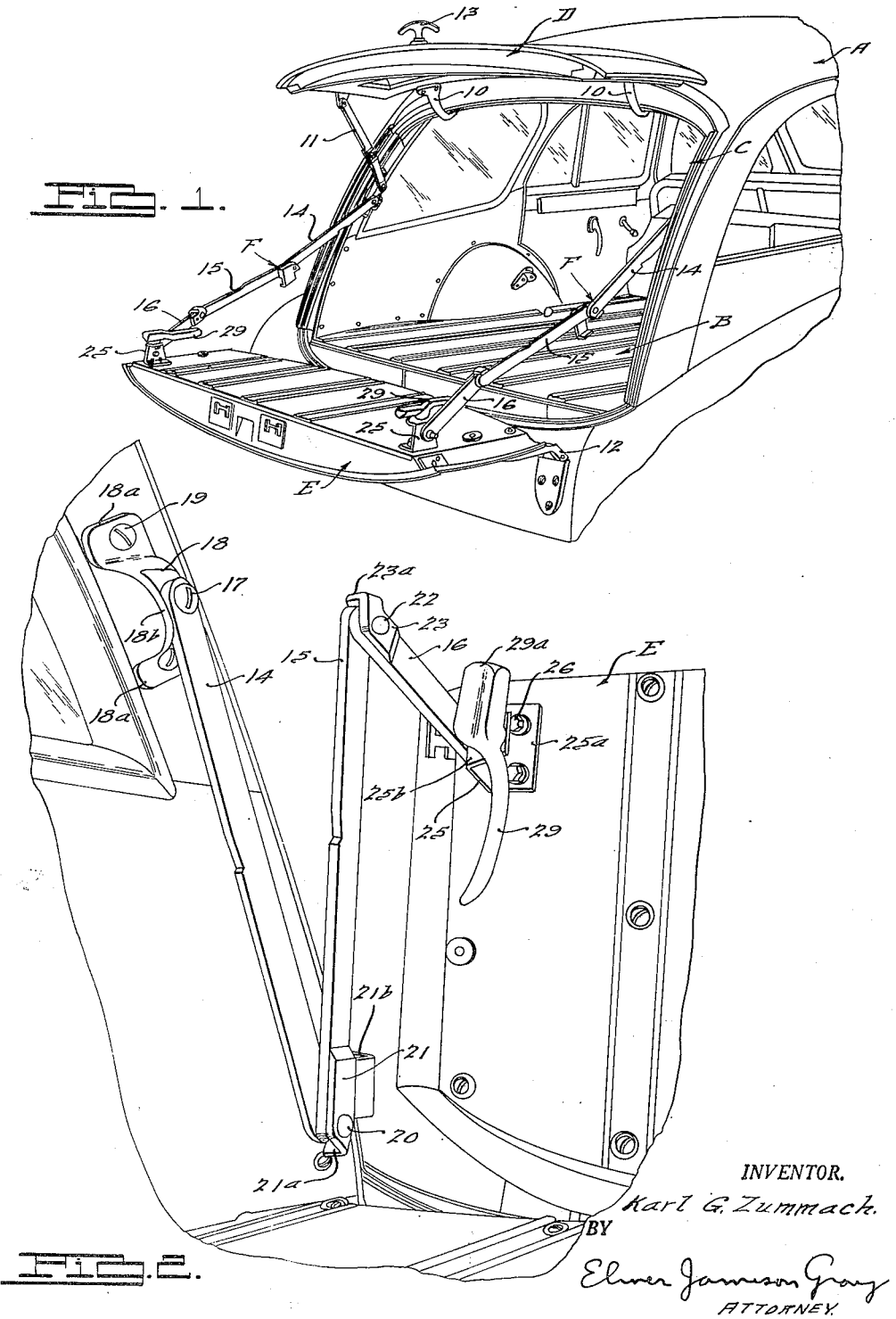

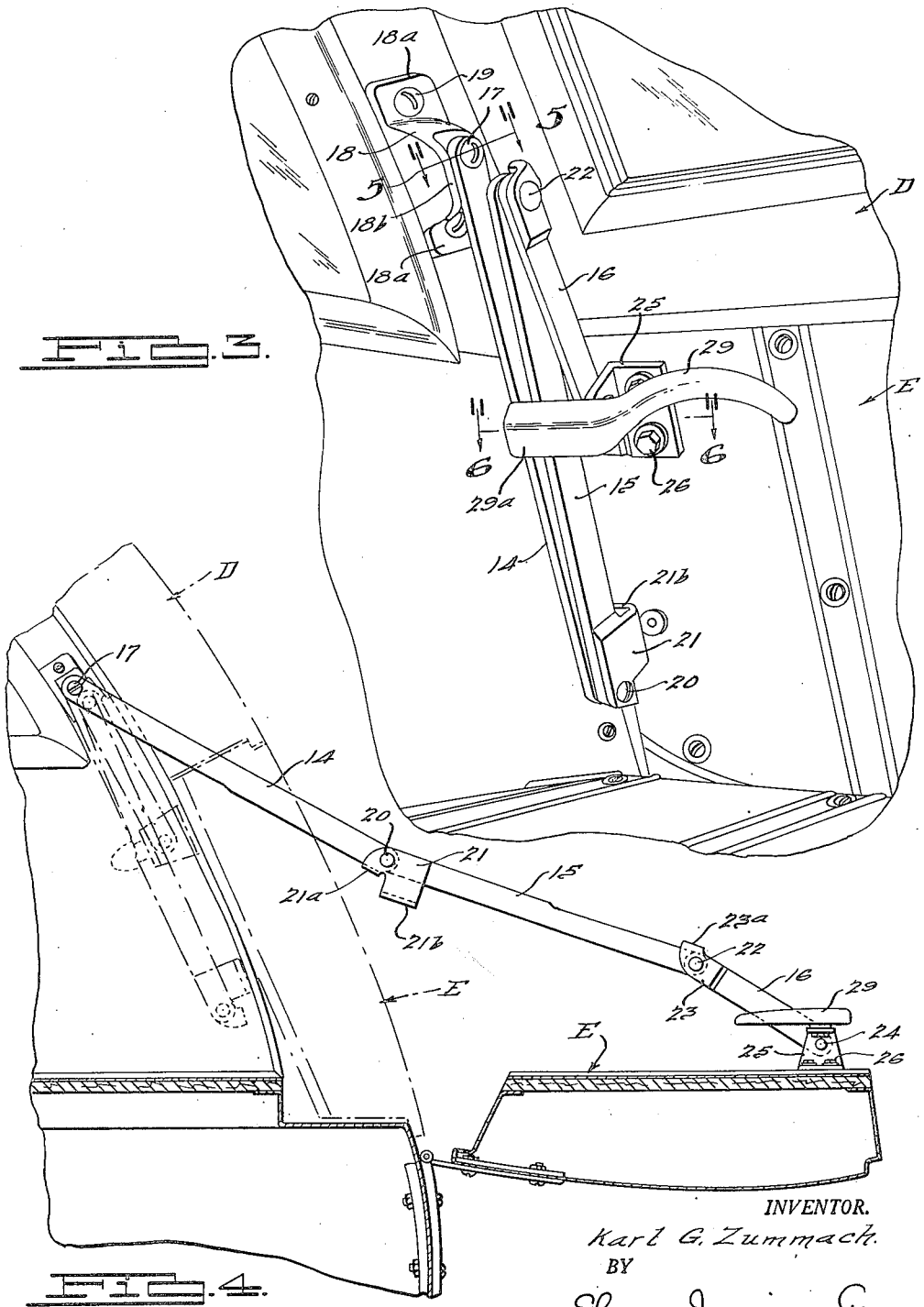

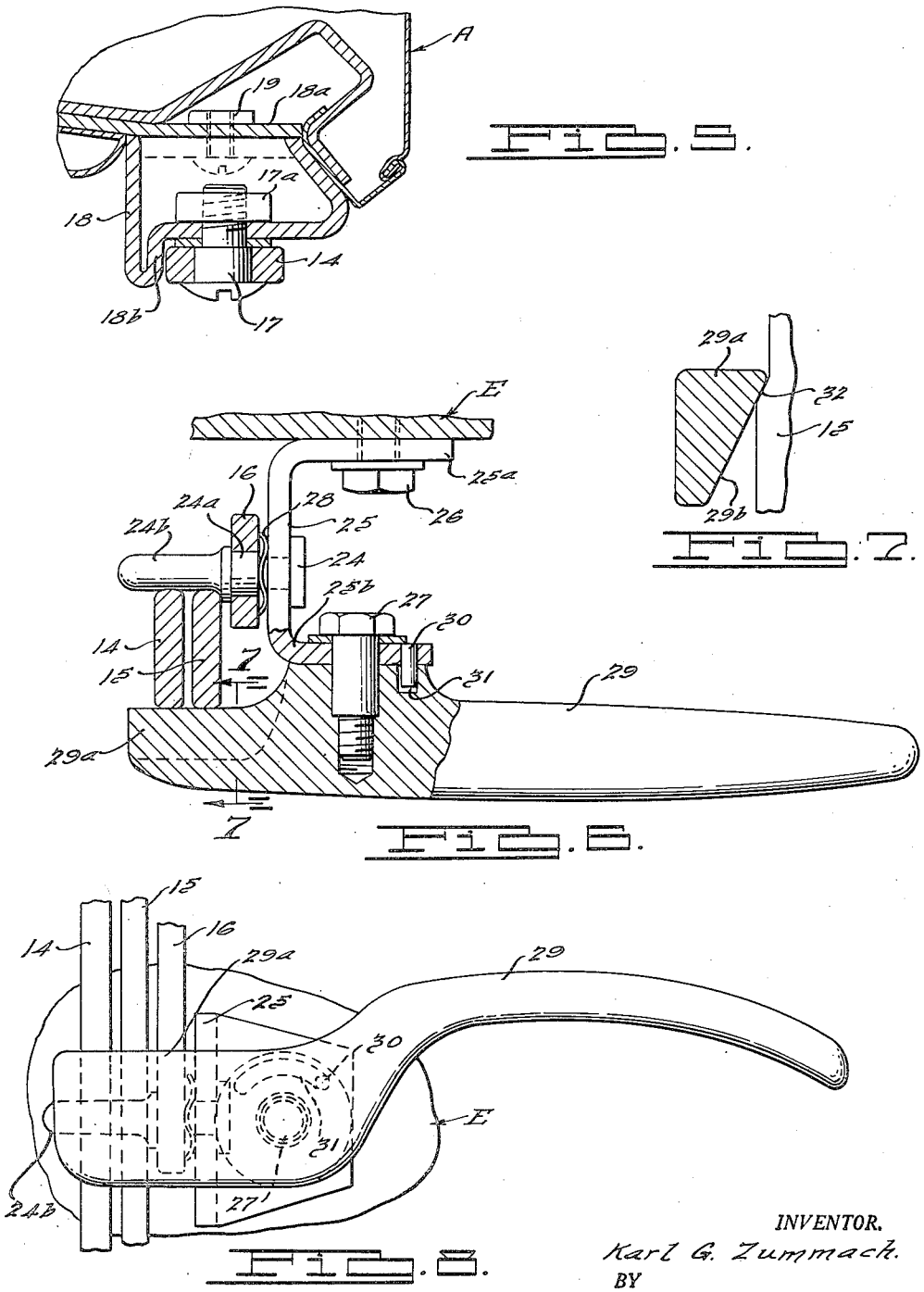

VEHICLE BODY CLOSURE CHECK MEANS AND LATCH

Karl G. Zummach, Detroit, Mich., assignor to Briggs Manufacturing Company, Detroit, Mich., a corporation of Michigan Application June 16, 1947, Serial No. 754,820

8 Claims. (Cl. 292—263)

This invention relates to vehicle bodies and particularly to the type of automobile body which is equipped with a luggage compartment in the rear of the tonneau and closure means for this compartment including an upwardly swinging deck lid and a downwardly swinging tail board. Although automobiles of this type are frequently termed station wagons, it will be understood that the invention is not limited to vehicle bodies characterized as station wagons since the invention has general applicability to various types of automobile or vehicle bodies.

An object of the invention is to provide a vehicle body having a hinged lid in the rear thereof for at least partially closing the opening into the luggage compartment of the body, this lid being hinged to swing down into a generally horizontal position to afford access to the compartment, and means of an improved nature being provided for holding the lid in this latter position and also for locking the lid in its closed position.

A further object of the invention is to provide, in a vehicle body having a rear deck lid adapted to be swung down to form a tail board, improved check arm means for holding the lid in open position and improved means cooperating with the check arm means for locking the lid in its closed position.

Another object of the invention is to provide check arm means for the swinging lid or tail board including articulated links or members adapted to support the lid in open generally horizontal position but adapted to be folded together when the lid is raised to its closed position, improved means including a handle being provided on the lid and operable to lock the lid in its closed position.

Still another object of the invention is to provide a foldable check arm device for supporting the tail board or lid in open position and a manually operable handle on the lid, accessible from the inside of the luggage compartment and cooperable with the check arm device for locking the lid or tail board in its upright, closed position.

More specifically an object of the invention is to provide an improved check arm device for the lid or tail board which comprises three pivotally connected links adapted to extend generally end to end for supporting the lid when swung down to a generally horizontal position, the links being foldable into overlapping relationship when the lid is raised to its closed or upright position, and means including a turnable handle being provided on the lid for clamping the links together and thus locking the lid in its closed position against movement.

Other objects of this invention will appear in the following description and appended claims, reference being had to the accompanying drawings forming a part of this specification wherein like characters designate corresponding parts in the several views.

Fig. 1 is a fragmentary perspective view of the rear end of a vehicle body constructed in accordance with the present invention.

Fig. 2 is an enlarged fragmentary perspective view taken from the inside of the body and illustrating the check arm device for the tail board in a partially closed position of the latter.

Fig. 3 is a view generally similar to Fig. 2 but illustrating the position of the check arm device when the deck lid or tail board is closed.

Fig. 4 is a fragmentary longitudinal section illustrating the position of the check arm device when the tail board or deck lid member is in fully open position.

Fig. 5 is an enlarged sectional view taken substantially through lines 5—5 of Fig. 3 looking in the direction of the arrows.

Fig. 6 is an enlarged sectional view taken substantially through lines 6—6 of Fig. 3 looking in the direction of the arrows.

Fig. 7 is a section taken substantially through lines 7—7 of Fig. 6 looking in the direction of the arrows.

Fig. 8 is an inside fragmentary elevation illustrating the clamping and locking members for the check arm device in their operative position.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated an automobile body A, such as a body of the type generally referred to as a station wagon, equipped with front and rear seats and having a tonneau open from front to rear. Within the rear of the tonneau is a luggage compartment B accessible from the rear of the vehicle through an opening C adapted to be closed by means of two closure or lid members D and E, the latter being frequently referred to as a tail board, The upper deck lid D is hinged in conventional manner by means of hinge arms 10 to the body so as to swing upwardly from a closed position shown in Fig. 3 to an open position shown in Fig. 1. When the deck lid D is raised to this open position it is supported by means of a suitable foldable check arm device 11. The deck lid or tail board E is suitably hinged at 12 to the body below the luggage compartment opening so as to swing from an upright closed position shown in Fig. 3 to an open generally horizontal position shown in Fig. 1. When the deck lids D and E are swung from their open positions shown in Fig. 1 to their closed positions, the lid D may be locked to the lid E by means of any conventional locking device controlled by means of a handle 13.

The lower deck lid E is supported in its open generally horizontal position, shown in Figs. 1 and 4, by means of a pair of check arm devices, each of which is identical in construction and generally indicated at F. Each check arm device F comprises, in the present embodiment of the invention, a relatively long inner link 14, an intermediate link 15 which is preferably somewhat shorter than the link 14, and a relatively short outer link 16. The link 14 is pivoted at its upper end on a threaded shoulder stud 17 carried by a bracket 18 and held in position by means of a nut 17a. The bracket 18, as illustrated in Fig. 5, is generally channel shaped providing vertically spaced base flanges 18a secured by means of screws 19 to the inside paneling or framework of the body immediately in rear of the rear quarter window. The outer side of the bracket 18, intermediate the base flanges 18a, is pressed to provide a projecting abutment 18b adapted to be engaged by the upper rear edge of the link 14 when the lid E is closed, this abutment thus limiting the rearward movement of the link 14 when the check arm device is folded.

The lower or outer end of the link 14 overlaps the adjacent end of the intermediate link 15 and is pivoted thereto at 20. Rigidly attached to the link 15, adjacent the pivot 20, is a retainer piece 21 which has a flange 21a engageable with the lower edge of the link 14, when the links are extended as shown in Fig. 4, so as to retain them rigidly in end to end position. The retainer piece 21 also has a flange portion 21b adapted to engage the front edge of the link 14 when the links are folded together.

The outer end of the intermediate link 15 of the check arm device overlaps the adjacent end of the outer link 16 and is pivoted thereto at 22. Rigidly attached to the link 16 at the locality of the pivot 22 is a retainer piece 23 which is formed with a flange portion 23a adapted to engage the upper edge of the link 15 and rigidly retain the links in end to end position.

The outer end of the link 16 is pivotally mounted upon a cylindrical portion 24a of a pivot stud 24 mounted upon the intermediate web of a U-shaped bracket 25, see Fig. 6. This bracket has an outer flange 25a secured by means of bolts 26 to the upper part of the deck lid E. The bracket 25 also has an inner flange 25b carrying a stud 27 upon which is mounted a handle 29. Mounted upon the stud 24 and interposed between the outer end of the link 16 and the bracket 25 is a friction washer 28. Beyond the bearing portion 24a the stud 24 is formed with an integral pin extension 24b engageable with the links 14 and 15 when the deck lid E is closed.

The handle 29 is threaded onto the inner end of the stud or bolt 27 and is adapted to turn within limits upon the bracket 25. In the present instance the turning motion of the handle is limited to an arc of 90°, i. e. from an upright position shown in Fig. 2 to a horizontal position shown in Fig. 3. This is accomplished by means of a stop pin 30 fixed to the bracket flange 25b and extending into an arcuate slot 31 machined in the hub portion of the handle 29. Engagement of the stop pin 30 with the ends of the slot 31 limits the turning motion of the handle.

The handle 29 is integrally formed with a projecting nose 29a formed on its outer side with a tapered face 29b. The links 14 and 15 are formed with correspondingly tapered portions 32 adapted to lie in the same transverse plane when the links are folded together into overlapping relation as shown in Figs. 3, 6 and 8. The tapered portions 32 are adapted to be engaged by the tapered face 29b of the nose 29a of the handle when the latter is turned into locking engagement with the links 14 and 15.

It will be apparent from the foregoing construction that the links 14, 15 and 16 will unfold and extend substantially end to end when the deck lid or tail board E is swung outwardly and downwardly to its open generally horizontal position as shown in Figs. 1 and 4. The check arm devices F, therefore, will rigidly support the deck lid E when in this open position. Upon closing the deck lid E it is swung upwardly and forwardly, thus folding the several links of the check arm devices. In the fully closed position of the deck lid the links 14 and 15 will assume a parallel overlapping position as shown in Fig. 6 and will be engaged by the clamping pin 24b. These links may be immovably clamped in position by turning the handle from its upright position shown in Fig. 2 to a horizontal position shown in Fig. 3. The tapered face 29b of the handle will engage the rear edges of the links 14 and 15, thus clamping the links tightly between the nose 29a of the handle and the pin 24b. Manipulation of the handle may be readily accomplished by reaching over the tail board into the interior of the luggage compartment while the upper deck lid D is still in open position. Thus, with the handle 29 at each side of the vehicle turned down to its horizontal position shown in Fig. 3 each check arm device will be rigidly locked against movement, hence locking the deck lid E against movement. The upper deck lid D may then be swung down and latched to the deck lid E by manipulating the handle 13.

I claim:

1. In an articulated check device and locking means for a pair of members movable relative to each other, a plurality of pivotally connected check links connecting said members for moving in unison therewith, said links being foldable into juxtaposed relation upon relative movement of said members to one position and being unfoldable upon relative movement of said members to another position, operative lever means mounted on one of said members for moving generally transversely across certain of said links into engagement therewith at the folded position to block unfolding movement, and abutment means on said one member adapted to engage certain of said links at the folded position in a clamping action opposing said lever means, said lever means and the link portions engageable thereby having cooperating cam surfaces for binding the links tightly between the abutment means and lever means upon operation of the latter.

2. In a closure member hingedly mounted on a supporting member for swinging relative to the support to and from open and closed positions, an articulated check device connecting said members for moving the closure member to and from the closed position including a plurality of pivotally connected links foldable into juxtaposition at the closed position of the closure member, an operative lever movably mounted on one of said members for engaging certain of said links intermediate their articulated ends to block unfolding movement thereof at the closed position of the closure member, and abutment means provided by said one member for moving therewith into abutment with certain of said links in opposition to said lever at the closed position, said lever and the portions of the links engaged thereby having cooperating cam surfaces for binding the links tightly between the abutment means and lever upon operation of the latter.

3. In a closure member hingedly mounted on a supporting member for swinging relative to the support to and from open and closed positions, an articulated check device connecting said members for moving the closure member to and from the closed position including a plurality of pivotally connected links foldable into juxtaposition at the closed position of the closure member, an operative lever pivotally mounted on one of said members for swinging into engagement with certain of said links intermediate their articulated ends at the closed position of the closure member and abutment means provided by said one member for moving therewith into abutment with certain of said links in opposition to said lever at the closed position, said lever and the portions of the links engaged thereby having cooperating cam surfaces for binding the links tightly between the abutment means and lever upon operation of the latter.

4. In a closure member hingedly mounted on a supporting member for swinging relative to the support to and from open and closed positions, an articulated check device connecting said members for moving the closure member to and from the closed position including a plurality of pivotally connected links foldable into juxtaposition at the closed position of the closure member, an operative lever pivotally mounted on one of said members for swinging transversely across certain of said links into engagement therewith intermediate their articulated ends at the closed position of the closure member to block unfolding of the links.

5. In an articulated check device and locking means for a pair of members movable relative to each other, a plurality of pivotally connected check links connecting said members for moving in unison therewith, said links being foldable into juxtaposed relation upon relative movement of said members to one position and being unfoldable upon relative movement of said members to another position, operative lever means pivotally mounted on one of said members for swinging transversely across certain of said links into engagement therewith intermediate their articulated ends at the folded position to block unfolding movement, and abutment means provided by said one member for abutting certain of said links in opposition to said lever means at the folded position, said lever means and the link portions engaged thereby having cooperating cam surfaces for binding the links tightly between the abutment and lever means upon operation of the latter.

6. In an articulated check device and locking means for a pair of members movable relative to each other, a plurality of pivotally connected check links connecting said members for moving in unison therewith, said links being foldable into juxtaposed relation upon relative movement of said members to one position and being unfoldable upon relative movement of said members to another position, and lever means pivotally mounted on one of said members for swinging into engagement with certain of said links intermediate their articulated ends as said links approach the folded position, said lever means and link portions engaged thereby having cooperating surfaces for wedging the links into the folded position.

7. In an articulated check device and locking means for a pair of members movable relative to each other, a plurality of pivotally connected check links connecting said members for moving in unison therewith, said links being foldable into juxtaposed relation about parallel pivot axes upon relative movement of said members to one position and being unfoldable upon relative movement of said members to another position, and lever means pivotally mounted on one of said members for swinging transversely across at least one of said links into engagement therewith as said links approach the folded position, said lever means and link portions engaged thereby having cooperating surfaces for wedging the links into the folded position, and the axis of swinging of the lever means being generally parallel to the aforesaid action wedging the links into folded position.

8. In an articulated check device and locking means for a pair of members movable relative to each other, a plurality of pivotally connected check links connecting said members for moving in unison therewith, said links being foldable into juxtaposed relation upon relative movement of said members to one position and being unfoldable upon relative movement of said members to another position, and lever means pivotally mounted on one of said members for swinging into engagement with certain of said links intermediate their articulated ends at the folded position to block unfolding of the links.

KARL G. ZUMMACH.

REFERENCES CITED

The following references are of record in the file of this patent:

UNITED STATES PATENTS

| Number | Name | Date |
| --- | --- | --- |
| 413,164 | Blee | Oct. 22, 1889 |
| 414,395 | George et al. | Nov. 5, 1889 |
| 634,875 | Butler | Oct. 17, 1899 |
| 729,840 | Butler et al. | June 2, 1903 |
| 917,960 | Melrose et al. | Apr. 13, 1909 |
| 933,555 | Hallam | Sept. 7, 1909 |
| 1,024,780 | Hotchkiss | Apr. 30, 1912 |
| 2,263,065 | Baldauf | Nov. 18, 1941 |
| 2,422,912 | Kling | June 24, 1947 |
| 2,433,169 | Stephenson et al. | Dec. 23, 1947 |

FOREIGN PATENTS

| Number | Country | Date |
| --- | --- | --- |
| 11,120 | Denmark | Aug. 3, 1908 |